United States Patent
Park

(10) Patent No.: US 10,394,361 B2
(45) Date of Patent: Aug. 27, 2019

(54) TOUCH DISPLAY DEVICE

(71) Applicant: LG Display Co., Ltd., Seoul (KR)

(72) Inventor: Yong-Jin Park, Gumi-si (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 15/837,760

(22) Filed: Dec. 11, 2017

(65) Prior Publication Data

US 2018/0188868 A1    Jul. 5, 2018

(30) Foreign Application Priority Data

Dec. 30, 2016 (KR) .................. 10-2016-0183733

(51) Int. Cl.
*G06F 3/041* (2006.01)
*G09G 3/20* (2006.01)

(52) U.S. Cl.
CPC .......... *G06F 3/0412* (2013.01); *G06F 3/0418* (2013.01); *G09G 3/20* (2013.01); *G09G 3/2092* (2013.01); *G09G 2354/00* (2013.01)

(58) Field of Classification Search
CPC ........ G06F 3/0418; G06F 3/0412; G09G 3/20
See application file for complete search history.

(56) References Cited

U.S. PATENT DOCUMENTS

| | | | |
|---|---|---|---|
| 8,842,081 B2* | 9/2014 | Zeng ................... | G06F 3/0416 345/173 |
| 2008/0018613 A1* | 1/2008 | Kim ...................... | G06F 3/0412 345/173 |
| 2011/0193817 A1* | 8/2011 | Byun .................... | G06F 3/0418 345/174 |
| 2013/0141348 A1* | 6/2013 | Jamshidi-Roudbari ..................... G06F 3/0412 345/173 |
| 2013/0235003 A1* | 9/2013 | Chang .................. | G09G 3/3677 345/204 |
| 2017/0169537 A1* | 6/2017 | Nemiroff .............. | G06F 3/0416 |

FOREIGN PATENT DOCUMENTS

CN    104572328 A    4/2015

* cited by examiner

*Primary Examiner* — Ariel A Balaoing
(74) *Attorney, Agent, or Firm* — Birch, Stewart, Kolasch & Birch, LLP

(57) ABSTRACT

A touch display device according to an embodiment includes a display panel including a plurality of gate lines and a plurality of data lines for displaying an image and a plurality of touch sensing electrodes for sensing a touch, an application host processor configured to output an image signal, a touch control signal, and a reset signal, and a display driver integrated circuit configured to process the image signal to output the processed image signal to the display panel, receive a touch signal from a touch sensing electrode installed in the display panel, convert the touch signal into a digital signal to output a touch sensing data, and reset the display driver integrated circuit and output an interrupt signal to the application host processor upon occurrence of an error caused by electrostatic discharge.

7 Claims, 3 Drawing Sheets

TOUCH DISPLAY DEVICE

This application claims the priority benefit of Korean Patent Application No. 10-2016-0183733, filed on Dec. 30, 2016 in the Republic of Korea, which is hereby incorporated by reference as if fully set forth herein.

BACKGROUND OF THE INVENTION

Field of the Invention

The present invention relates to a display device and, more particularly, to a touch display device including a driver integrated circuit (IC) capable of detecting an error caused by electrostatic discharge in the driver integrated circuit and autonomously resetting the driver IC.

Discussion of the Related Art

Representative flat panel display devices for displaying images using digital data include a liquid crystal display (LCD) device using liquid crystal, an organic light-emitting diode (OLED) display device using OLEDs, and the like.

The LCD device is formed by bonding two substrates on which respective electrodes are formed so as to face each other and injecting liquid crystal materials between the two substrates. In such a structure, if a voltage is supplied to the two electrodes, electric fields generated by the voltage cause liquid crystal molecules to move, thereby displaying picture images according to light transmittance varying with movement of the liquid crystal molecules.

However, since the LCD device with the above-described structure is not a self-luminescent display, the LCD device is disadvantageously equipped with a backlight.

Meanwhile, the OLED display device is a self-luminescent device which causes an organic light-emitting layer to emit light through recombination of electrons and holes and is expected to be the next-generation display device due to high luminance, low driving voltage, and ultra-thin film thickness.

The OLED display device includes a plurality of pixels each including an OLED element having an organic light-emitting layer between an anode and a cathode, and a pixel circuit for independently driving the OLED element. The pixel circuit includes a switching thin-film transistor (TFT) for supplying a data voltage to a storage capacitor and a driving TFT for controlling driving current according to a driving voltage charged in the storage capacitor and supplying the driving current to the OLED element. The OLED element generates light proportional to the driving current.

The above-described flat panel display includes an LCD panel or an OLED display panel which includes a plurality of gate lines and a plurality of data lines and includes a plurality of pixels arranged in a matrix form, a gate driver for driving the gate lines (scan lines), a data driver for driving the data lines, and a timing controller for supplying various control signals and image data to the gate driver and the data driver.

Generally, a mobile device such as a smartphone is equipped with various functions according to a trend towards high-end products. Particularly, as multimedia functions such as an MP3 player function and a digital camera function are provided to the mobile device to meet such a trend, a display device, such as the LCD or the OLED display device, used in the mobile device requires increasingly higher resolution to display multimedia data rather than simple text. As the mobile device is equipped with the multimedia function and the display device having high resolution, a considerably high transmission rate is demanded for data transmission between a central controller unit and the display device.

To transmit multimedia data at a high speed, the mobile device uses a parallel interface scheme. Since the mobile device needs to be small in size, the parallel interface scheme occupying a large area is difficult to apply to the mobile device.

Further, with the increase in image resolution, data traffic between a mobile application processor (AP) and a display driver IC has rapidly increased. Accordingly, power consumed in the mobile AP and/or the display driver IC has also gradually increased.

A general mobile phone focusing on voice talk has already been increasingly replaced with a smartphone focusing on multimedia data. The display driver IC mounted in the smartphone frequently operates to display multimedia data such as still image signal or a moving image signal on a display. Therefore, a battery run-time of the smartphone decreases. The battery run-time means a use time of a battery on one charge. As such, there is needed a method of prolonging the battery run-time of a mobile communication device including the smartphone which processes the still image signal and the moving image signal.

To this end, a mobile industry processor interface (MIPI) used for the mobile device for high-speed serial transmission has been proposed.

To transmit data at a high speed, a clock (clock signal) needs to be transmitted together with data. Although, in the MIPI scheme, the clock is transmitted together with the data, the data is transmitted with a narrow swing width in a low common mode.

A display device of the MIPI scheme according to a related art will now be described.

FIG. 1 is a block diagram of a display device of an MIPI scheme according to the related art and FIG. 2 illustrates a detailed configuration of a display driver IC 20 shown in FIG. 1.

Referring to FIGS. 1 and 2, the display device of the MIPI scheme refers to a mobile device, such as a mobile phone, a smartphone, a tablet personal computer (PC), a personal digital assistant (PDA), a portable multimedia player (PMP), a handheld device, or a handheld computer, capable of displaying a still image signal or a moving image signal on a display.

The display device of the MIPI scheme includes, as illustrated in FIG. 1, an application host processor (AP) 10, the display driver IC (D-IC) 20, and a display panel 30.

The AP 10 transmits, according to a clock signal CLK, a packet PAC including a mode switching command to the display driver IC 20 via an MIPI path, depending on whether a codec mounted in the AP 10 is executed. The mode switching command indicates whether an image signal to be displayed on the display panel 30 is a still image signal or a moving image signal. The packet PAC includes a vertical synchronization packet Vsync, a horizontal synchronization packet Hsync, a data stream packet including an image signal Data to be displayed, and a command packet CP. An operating mode is divided into a command mode for processing the still image signal and a video mode for processing the moving image signal.

The display driver IC 20 restores a vertical synchronization signal and a horizontal synchronization signal from the vertical synchronization packet Vsync and the horizontal synchronization packet Hsync, respectively, processes or restores data from the data stream packet, and transmits the processed or restored data Data to the display panel 30 in response to the mode switching command included in the command packet.

The display panel 30 may be implemented by an LCD panel, a light emitting diode (LED) display panel, an OLED display panel, or an active-matrix OLED (AMOLED) display panel.

In the display device of the MIPI scheme configured as described above, the display driver IC 20 may not interpret the packet PAC output from the AP 10 due to an external environment (e.g., electrostatic discharge (ESD)) or the display driver IC 20 may not receive a video signal due to the external environment.

That is, the display driver IC 20 receives the packet PAC from the AP 10, restores the vertical synchronization signal and the horizontal synchronization signal, and then displays image data using an inversion scheme in synchronization with the restored vertical and horizontal synchronization signals.

However, the display driver IC 20 may miss the packet PAC output from the AP 10 and may not recognize the synchronization signals, due to an external environment (e.g., ESD). In addition, the display driver IC 20 may not receive the video signal due to ESD.

To solve the above problems, the display driver IC 20 may have a construction for resetting itself when the display driver IC 20 cannot recognize the synchronization signals or cannot receive the video signal due to the external environment (ESD) as illustrated in FIG. 2.

In more detail, the display driver IC 20 includes a digital serial interface (DSI) unit 21 for receiving the packet PAC through an MIPI from the AP 10, restoring the vertical synchronization signal and the horizontal synchronization signal from the vertical synchronization packet and the horizontal synchronization packet, respectively, detecting presence/absence of an error caused by the external environment (ESD) in a signal transmitted through the MIPI, and outputting an error detection signal DSI Error upon determining that an error has occurred due to the external environment (ESD). The display driver IC 20 further includes a display command set (DCS) unit 23 for receiving image data from the DSI unit 21, outputting an analog data signal to the display panel 30, performing checksum to determine whether an MIPI clock is changed with respect to each vertical synchronization signal, and outputting an error detection signal Checksum Error by determining that an error has occurred by the external environment (ESD) when the MIPI clock is changed. The display driver IC 20 further includes an interrupt reset generator 22 for outputting a reset signal DSI Reset to the DSI unit 21 when the DSI unit 21 or the DCS unit 23 outputs an error signal, outputting an interrupt signal INT to the AP, and outputting an ESD reset signal ESD Reset and a second OR gate 24 for outputting a reset signal DIC Reset to reset the display processor 20 by performing a logical OR operation on the ESD display reset ESD Reset output by the interrupt reset generator 22 and the reset signal Reset output from the AP 10.

Accordingly, when an error occurs in the display driver IC 20 of the display device of the MIPI scheme due to the external environment, since the display driver IC is reset, a malfunction caused by the external environment (ESD) can be prevented.

However, a recent display device of the MIPI scheme, for example, a mobile phone, a smartphone, a tablet PC, a PDA, a PMP, or a handheld computer, has a touch function for outputting information corresponding to a touch point or performing a calculation operation by sensing the touch point at which a finger or a stylus pen comes in contact with a display panel through variation in electrical characteristics such as resistance or capacitance at the touch point.

Therefore, the display driver IC 20 is driven by time-dividing each frame period into a data writing period during which image data is written in pixels and a touch driving period during which touch is sensed, and includes a touch sensing unit for transmitting touch information during the touch driving period.

However, there was no technique for preventing a malfunction caused by the external environment (ESD) in a display driver IC of a touch display device including the touch sensing unit.

SUMMARY OF THE INVENTION

Accordingly, the present invention is directed to a touch display device that substantially obviates one or more problems due to limitations and disadvantages of the related art.

An object of the present invention is to provide a touch display device including a driver IC capable of sensing an error upon occurrence of an error caused by electrostatic discharge and autonomously resetting the driver IC.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a touch display device includes a display panel including a plurality of gate lines and a plurality of data lines for displaying an image and a plurality of touch sensing electrodes for sensing touch, an application host processor configured to output an image signal, a touch control signal, and a reset signal, and a display driver integrated circuit configured to process the image signal to output the processed image signal to the display panel, receive a touch signal from a touch sensing electrode installed in the display panel, convert the touch signal into a digital signal to output a touch sensing data, and reset the display driver integrated circuit and output an interrupt signal to the application host processor upon occurrence of an error caused by electrostatic discharge.

The display driver integrated circuit may include a display processor configured to process the image signal to output the processed image signal to the display panel and output a display error signal upon occurrence of an error caused by electrostatic discharge, and a touch sensing processor configured to receive the touch signal from the touch sensing electrode installed in the display panel, convert the touch signal into the digital signal to output the touch sensing data, receive the display error signal to output a display reset signal, and output the display reset signal or a touch reset signal and simultaneously output an interrupt signal to the application host processor, upon occurrence of an error caused by electrostatic discharge.

The display processor may include a digital serial interface unit configured to receive a packet via a mobile industry processor interface from the application host processor to restore a vertical synchronization signal and a horizontal synchronization signal, and output a first error detection signal upon occurrence of an error in a signal transmitted via the mobile industry processor interface, a display command set unit configured to receive a clock signal and image data from the digital serial interface unit, output an analog data signal to the display panel, perform a checksum operation to determine whether an mobile industry processor interface clock is changed with respect to each vertical synchronization signal, and output a second error detection signal when the mobile industry processor interface clock is changed, and an interrupt reset generator configured to output a reset signal to the digital serial interface unit and output the display error signal to the touch sensing processor, when the digital serial interface unit or the display command set unit generates the first or second error detection signal.

The touch display device may further include a first OR gate configured to reset the display processor by performing a logical OR operation on the display reset signal from the touch sensing processor and the reset signal from the application host processor.

The touch sensing processor may include a touch interface unit configured to receive the touch control signal from the application host processor to output a touch enable signal and a wakeup signal, and output a pulse width modulation signal for sensing touch to the display panel, a touch sensing unit configured to sense the touch signal from the touch sensing electrode installed in the display panel and convert the touch signal into the digital signal to output the digital signal, and a microcontroller unit configured to output the touch reset signal and simultaneously output the interrupt signal to the application host processor upon occurrence of an error caused by electrostatic discharge in the touch interface unit, and output the display reset signal and simultaneously output the interrupt signal to the application host processor upon occurrence of an error caused by electrostatic discharge in the display processor.

The touch display device may further include a second OR gate configured to reset the touch sensing processor by performing a logical OR operation on the touch reset signal from the microcontroller unit and the reset signal from the application host processor.

When the touch enable signal or the wakeup signal is not present during a touch sensing period after a display period, the microcontroller unit may determine that an error has occurred due to electrostatic discharge and output the touch reset signal and simultaneously output the interrupt signal to the application host processor.

When the touch sensing data output from the touch sensing unit denotes a value which is greater or less than a predetermined value, the microcontroller unit may determine that an error has occurred due to electrostatic discharge and output the touch reset signal and simultaneously output the interrupt signal to the application host processor.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment s of the invention and together with the description serve to explain the principle of the invention. In the drawings.

DETAILED DESCRIPTION OF THE EMBODIMENTS

Reference will now be made in detail to the exemplary embodiments of the present invention, examples of which are illustrated in the accompanying drawings. Wherever possible, the same reference numbers will be used throughout the drawings to refer to the same or like parts.

A touch display device according to various embodiments of the present invention will now be described in detail with reference to the attached drawings. All the components of the touch display device according to all embodiments of the present invention are operatively coupled and configured.

Figure 1:
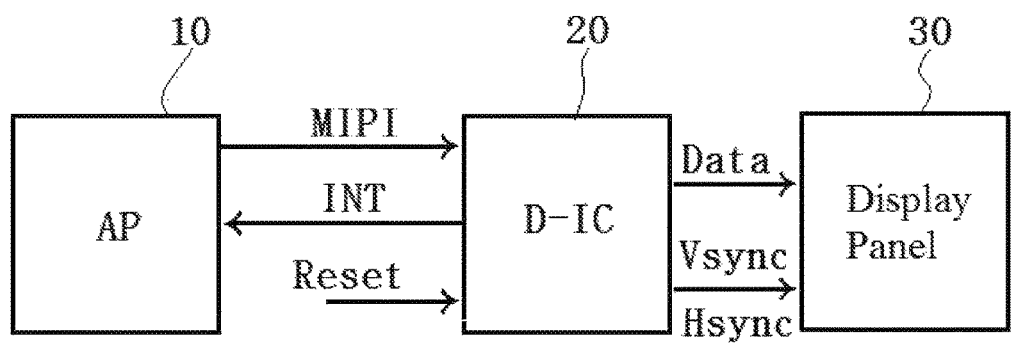
FIG. 1 is a block diagram of a display device of an MIPI scheme according to a related art.
Figure 2:
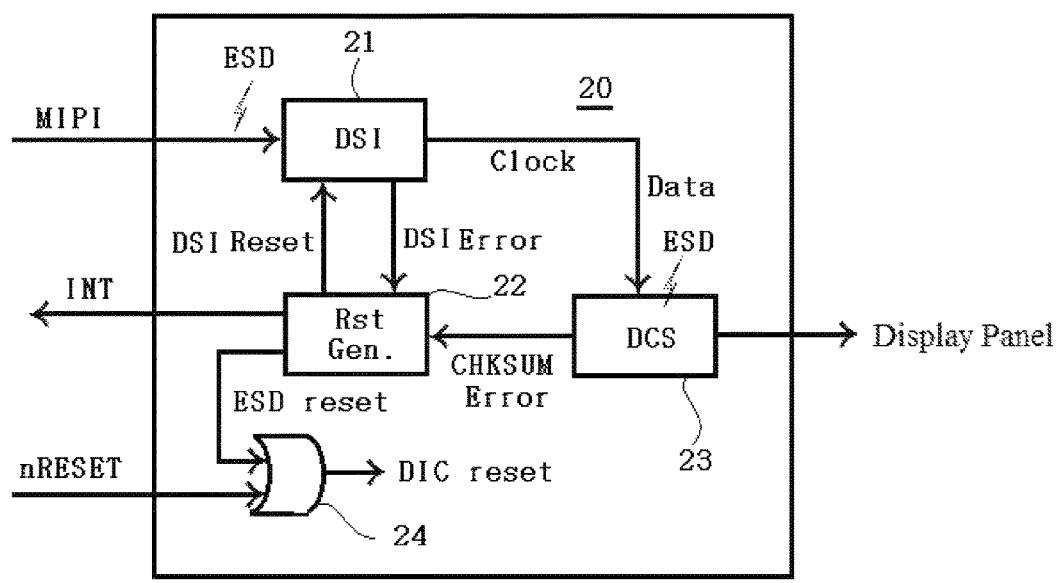
FIG. 2 illustrates a detailed configuration of a display driver IC shown in FIG. 1.
Figure 3:
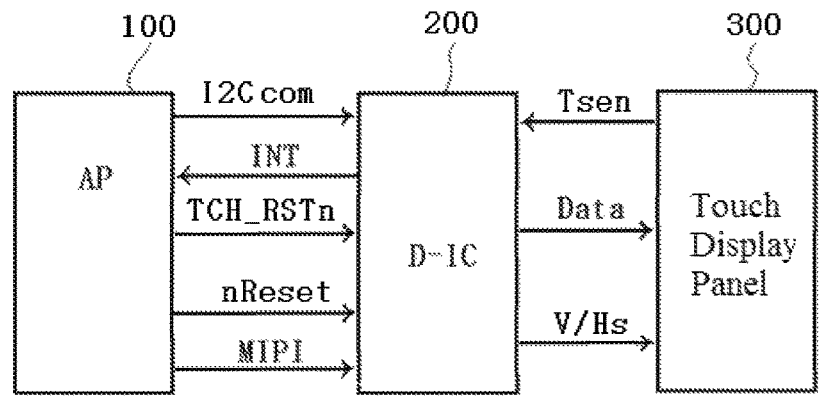
FIG. 3 is a block diagram of a touch display device of an MIPI scheme according to an embodiment of the present invention.

FIG. 3 is a block diagram of a touch display device of an MIPI scheme according to an embodiment of the present invention.

The touch display device according to the present invention includes, as illustrated in FIG. 3, an application host processor (AP) 100, a display driver IC (D-IC) 200, and a display panel 300.

The AP 100 transmits, according to a clock signal CLK, a packet PAC including a mode switching command to the display driver IC 200 via an MIPI path, depending on whether a codec mounted in the AP 100 is executed. The mode switching command indicates whether an image signal to be displayed on the display panel 300 is a still image signal or a moving image signal. The packet PAC includes a vertical synchronization packet Vs, a horizontal synchronization packet Hs, a data stream packet DS including an image signal to be displayed, and a command packet CP. An operating mode is divided into a command mode for processing the still image signal and a video mode for processing the moving image signal.

The AP 100 outputs various control signals including a touch synchronization signal Tsync, a pulse width modulation (PWM) signal Tpwm, and a clock signal, for detecting a touch location from a touch electrode installed in the display panel 300, and receives touch sensing data Tdata from the display driver IC 200.

Upon receiving an interrupt signal TCH_ATTN indicating that an error has occurred inside the display driver IC 200, the AP 100 outputs reset signals TCH_RSTn and nRESET to the display driver IC 200.

The display driver IC 200 restores a vertical synchronization signal and a horizontal synchronization signal from the vertical synchronization packet Vs and the horizontal synchronization packet Hs, respectively, processes or restores data from the data stream packet, and transmits the processed or restored data DATA to the display panel 300 in response to the mode switching command included in the command packet.

In addition, the display driver IC 200 receives an analog touch signal from the touch electrode installed in the display panel 300 and converts the analog touch signal into a digital signal to transmit the touch sensing data Tdata converted into the digital signal to the AP 100.

When an error is generated by an external environment (ESD), the display driver IC 200 resets itself and transmits an interrupt signal TCH_ATTN indicating that an error has occurred due to the external environment (ESD) to the AP 100.

The display panel 300 may be an LCD panel, an LED display panel, an OLED display panel, or an AMOLED display panel. Although not illustrated in the figure, the display panel 300 includes a plurality of gate lines and data lines for displaying images, a plurality of touch sensing electrodes (S11, S12, S13, S21, S22, S23, S31, S32, and S33 of FIG. 5) for sensing touch, and a touch sensing line for connecting the touch electrodes.

The touch synchronization signal Tsync includes a frame period divided into a data writing period (display period) during which image data is written in pixels and a touch driving period (touch sensing period) during which touch is sensed.

Figure 4:
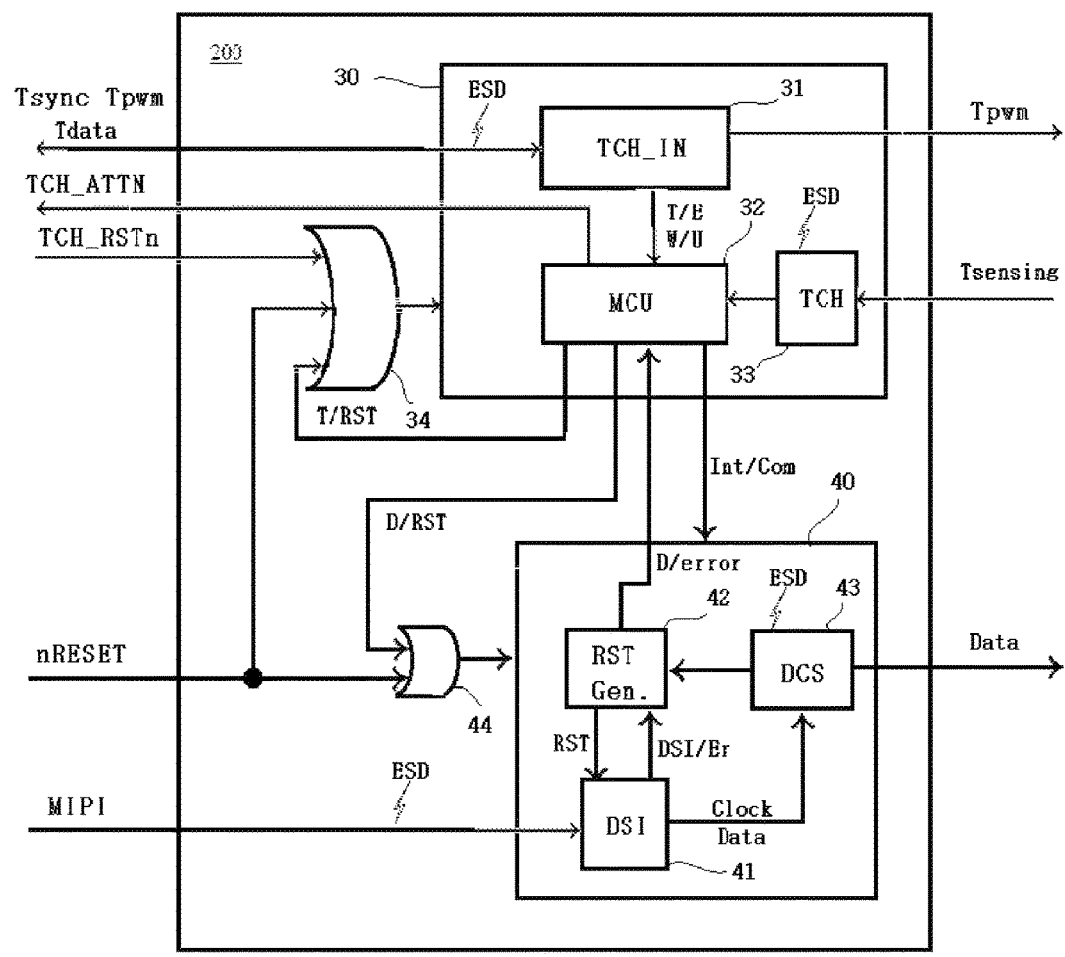
FIG. 4 illustrates a detailed configuration of a display driver IC according to an embodiment of the present invention.

FIG. 4 illustrates a detailed configuration of a display driver IC according to an embodiment of the present invention.

The display driver IC (e.g., the D-IC 200) according to the present invention broadly includes a touch sensing processor 30, a first OR gate 32, a second OR gate 44, and a display processor 40 as illustrated in FIG. 4.

The touch sensing processor 30 includes a touch interface unit (TCH_IN) 31, a microcontroller unit (MCU) 32, and a touch sensing unit (TCH) 33. The touch interface unit 31 receives various control signals including the touch synchronization signal Tsync, the PWM signal Tpwm, and the clock signal from the AP 100, outputs a touch enable signal T/E and a wakeup signal W/U to the microcontroller unit (MCU) 32, and outputs the PWM signal for touch sensing to the display panel 300. The touch sensing unit 33 senses a touch signal from the touch electrodes installed in the display panel 300 and converts the touch signal into a digital signal to output the digital signal. The microcontroller unit (MCU) 32 outputs a touch reset signal T/RST and simultaneously outputs the interrupt signal TCH_ATTN to the AP 100 upon occurrence of an error caused by an external environment (ESD) in the touch interface 31 and the touch sensing unit 33. The microcontroller unit (MCU) 32 outputs a display reset signal D/RST and simultaneously outputs the interrupt signal TCH_ATTN to the AP 100 upon occurrence of an error caused by the external environment (ESD) in the display processor 40. The microcontroller unit (MCU) 32 outputs an internal command signal Int/Com to the display processor 40.

In this case, the microcontroller unit (MCU) 32 receives the touch enable signal T/E or the wakeup signal W/U from the touch interface unit 31. When the touch enable signal T/E or the wakeup signal W/U is not present during the touch sensing period after the display period, the microcontroller unit (MCU) 32 determines that an error has occurred due to the external environment (ESD) and outputs the touch reset signal T/RST and simultaneously outputs the interrupt signal TCH_ATTN to the AP 100.

If the touch sensing data output from the touch sensing unit 33 denotes a value between 4,000 and 5,000, which is greater than a predetermined value of 2,500 to 3,500, or a value below 2,000, which is less than the predetermined value, the microcontroller unit (MCU) 32 determines that an error has occurred due to the external environment (ESD) in the touch sensing unit 33, and outputs the touch reset signal T/RST and simultaneously outputs the interrupt signal TCH_ATTN to the AP 100.

Upon receiving a display error signal D/error caused by the external environment (ESD) from the display processor 40, the microcontroller unit (MCU) 32 outputs the display reset signal D/RST and simultaneously outputs the interrupt signal TCH_ATTN to the AP 100.

The display processor 40 includes a digital serial interface (DSI) unit 41, an interrupt reset generator 42, and a display command set (DCS) unit 43. The digital serial interface (DSI) unit 41 receives the packet PAC via an MIPI from the AP 100 to restore the vertical synchronization signal and the horizontal synchronization signal from the vertical synchronization packet Vs and the horizontal synchronization packet Hs, respectively, detects presence/absence of an error caused by the external environment (ESD) in a signal transmitted through the MIPI, and outputs an error detection signal DSI/Er upon determining that an error has occurred due to the external environment (ESD). The display command set (DCS) unit 43 receives a clock signal Clock and image data Data from the digital serial interface (DSI) unit 41, outputs an analog data signal to the display panel 300, performs checksum to determine whether an MIPI clock is changed with respect to each vertical synchronization signal, and outputs an error detection signal CHKSUM Error by determining that an error has occurred due to the external environment ESD when the MIPI clock is changed. The interrupt reset generator 42 outputs a reset signal (RST) to the digital serial interface (DSI) unit 41 and outputs the display error signal D/error to the microcontroller unit (MCU) 32 of the touch sensing processor 30, when the digital serial interface (DSI) unit 41 or the display command set (DCS) unit 43 outputs the error signal DSI/Er or the CHKSUM Error.

The first OR gate 34 resets the touch sensing processor 30 by performing a logical OR operation on the touch reset signal TCH_RSTn and the driving IC reset signal nRESET received from the AP 100, and the touch reset signal T/RST received from the MCU 32.

The second OR gate 44 resets the display processor 40 by performing a logical OR operation on the display reset signal D/RST output from the microcontroller unit (MCU) 32 and the reset signal nRESET output from the AP 100.

An example of the configuration of the touch sensing unit 33 is discussed as follows.

Figure 5:
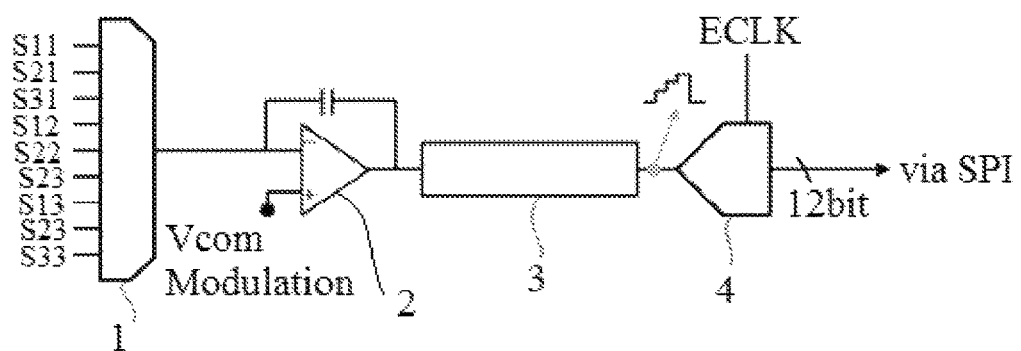
FIG. 5 illustrates a detailed configuration of a touch sensing unit according to an embodiment of the present invention.

FIG. 5 illustrates a detailed configuration of the touch sensing unit 33 according to an embodiment of the present invention.

The touch sensing unit 33 according to an example of the present invention includes, as illustrated in FIG. 5, a channel multiplexer 1 for receiving touch signals from among a plurality of touch sensing lines of the display panel 300 and outputting one selected touch signal, a preliminary amplifier 2 for preliminarily amplifying the touch signal output from the channel multiplexer 1, a sample-and-hold (S/H) amplifier 3 for performing sample-and-hold amplification on the preliminarily amplified touch signal, and an analog-to-digital (A/D) converter 4 for converting the touch signal output from the S/H amplifier 3 into a digital signal in response to a clock signal provided by the MCU and outputting the digital signal through a serial peripheral interface (SPI).

As described above, the display driver IC of the touch display device according to the embodiments of the present invention resets the display processor upon occurrence of an error in the display processor due to an external environment (ESD), additionally resets the touch sensing processor upon occurrence of an error in the touch sensing unit due to the external environment (ESD), and resets the display driver IC by outputting the interrupt signal TCH_ATTN to the AP. Therefore, a malfunction caused by the ESD can be prevented.

It will be apparent to those skilled in the art that various modifications and variations can be made in the present invention without departing from the spirit or scope of the invention. Thus, the present invention is intended to cover the modifications and variations of this invention within the scope of the appended claims and their equivalents.

What is claimed is:

1. A touch display device, comprising:
a display panel including a plurality of gate lines and a plurality of data lines for displaying an image and a plurality of touch sensing electrodes for sensing a touch;
an application host processor configured to output an image signal, a touch control signal, and a reset signal; and
a display driver integrated circuit configured to:
process the image signal to output the processed image signal to the display panel,
receive a touch signal from a touch sensing electrode installed in the display panel,
convert the touch signal into a digital signal to output a touch sensing data, and
reset the display driver integrated circuit and output an interrupt signal to the application host processor upon occurrence of an error caused by electrostatic discharge,
wherein the display driver integrated circuit includes:
a display processor configured to process the image signal to output the processed image signal to the display panel, and output a display error signal upon occurrence of an error caused by electrostatic discharge; and
a touch sensing processor configured to receive the touch signal from the touch sensing electrode installed in the display panel, convert the touch signal into the digital signal to output the touch sensing data, receive the display error signal to output a display reset signal, and output the display reset signal or a touch reset signal and simultaneously output an interrupt signal to the application host processor, upon occurrence of an error caused by electrostatic discharge.

2. The touch display device according to claim 1, wherein the display processor includes:
a digital serial interface unit configured to receive a packet via a mobile industry processor interface from the application host processor to restore a vertical synchronization signal and a horizontal synchronization signal, and output a first error detection signal upon occurrence of an error in a signal transmitted via the mobile industry processor interface;
a display command set unit configured to receive a clock signal and image data from the digital serial interface unit, output an analog data signal to the display panel, perform a checksum operation to determine whether an mobile industry processor interface clock is changed with respect to each vertical synchronization signal, and output a second error detection signal when the mobile industry processor interface clock is changed; and
an interrupt reset generator configured to output a reset signal to the digital serial interface unit and output the display error signal to the touch sensing processor, when the digital serial interface unit or the display command set unit generates the first or second error detection signal.

3. The touch display device according to claim 2, further comprising:
a first OR gate configured to reset the display processor by performing a logical OR operation on the display reset signal from the touch sensing processor and the reset signal from the application host processor.

4. The touch display device according to claim 1, wherein the touch sensing processor includes:
a touch interface unit configured to receive the touch control signal from the application host processor to output a touch enable signal and a wakeup signal, and output a pulse width modulation signal for sensing touch to the display panel;
a touch sensing unit configured to sense the touch signal from the touch sensing electrode installed in the display panel and convert the touch signal into the digital signal to output the digital signal; and
a microcontroller unit configured to output the touch reset signal and simultaneously output the interrupt signal to the application host processor upon occurrence of an error caused by electrostatic discharge in the touch interface unit, and output the display reset signal and simultaneously output the interrupt signal to the application host processor upon occurrence of an error caused by electrostatic discharge in the display processor.

5. The touch display device according to claim 4, further comprising:
a second OR gate configured to reset the touch sensing processor by performing a logical OR operation on the touch reset signal from the microcontroller unit and the reset signal from the application host processor.

6. The touch display device according to claim 4, wherein, when the touch enable signal or the wakeup signal is not present during a touch sensing period after a display period, the microcontroller unit determines that an error has occurred due to electrostatic discharge and outputs the touch reset signal and simultaneously outputs the interrupt signal to the application host processor.

7. The touch display device according to claim 4, wherein, when the touch sensing data output from the touch sensing unit denotes a value which is greater than or less than a predetermined value, the microcontroller unit determines that an error has occurred due to electrostatic discharge and outputs the touch reset signal and simultaneously outputs the interrupt signal to the application host processor.

* * * * *